Oct. 6, 1925.　　　　　　　　　　　　　　　　　　　　　　　　　1,556,127
W. A. PRUETT
BAIT CAN HOLDER
Filed Feb. 25, 1924
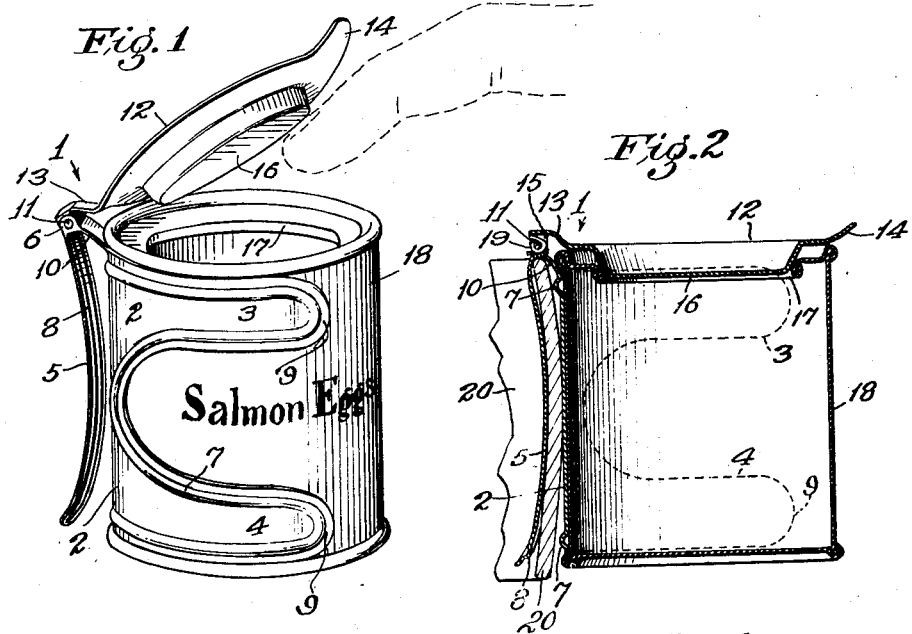
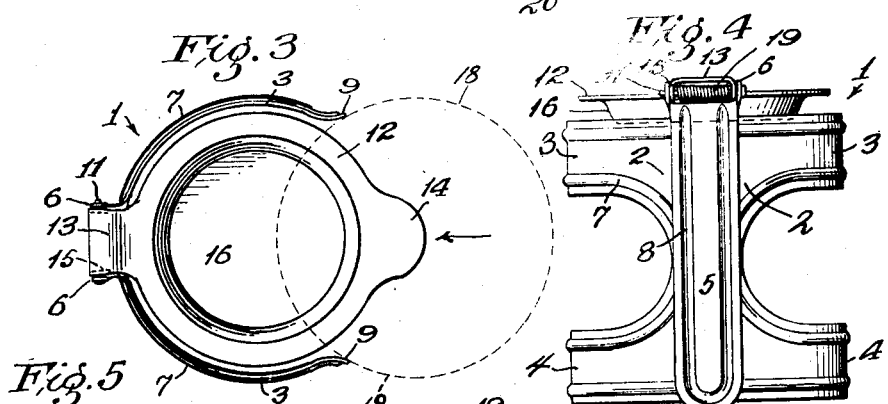
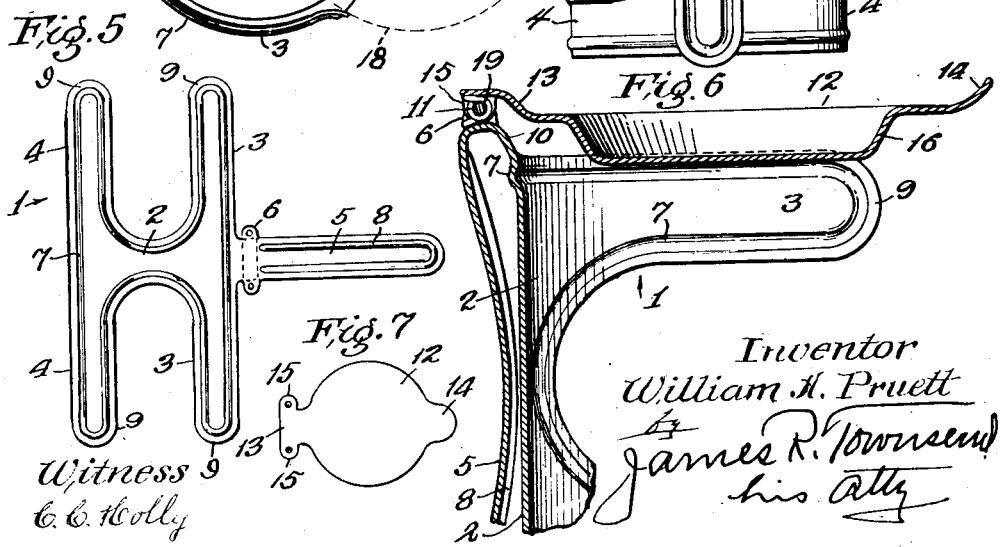
Witness
C. C. Holly
Inventor
William A. Pruett
by James R. Townsend
his Atty Patented Oct. 6, 1925.

1,556,127

UNITED STATES PATENT OFFICE.

WILLIAM A. PRUETT, OF LOS ANGELES, CALIFORNIA.

BAIT-CAN HOLDER.

Application filed February 25, 1924. Serial No. 695,073.

*To all whom it may concern:*

Be it known that I, WILLIAM A. PRUETT, a citizen of the United States, residing at Los Angeles, in the county of Los Angeles and State of California, have invented a new and useful Bait-Can Holder, of which the following is a specification.

This invention relates to means for holding cans of salmon egg bait for fishermen. Salmon egg bait is put up commercially in cans or jars of a certain size and an object of this invention is to provide a simple and satisfactory means by which a fisherman can secure the cans in a convenient place as on a belt that can be easily reached when he wishes to bait a hook; and a further object is to provide a bait holder that can be closed to keep the sun and air from the contents of the jar or can after the same has been opened for the fishermen to get at the bait.

As is well known, salmon eggs change color and also decay very rapidly when exposed to the sun and air and an object of the invention is to provide a convenient means for opening and closing a can so as to minimize the exposure of the salmon eggs which if changed in color lose their attractiveness as a fish lure; and if decayed are nauseating to handle.

An object of the invention is to provide an appliance whereby a bait can or jar may be provided with a hinged lid that is easily opened and closed; and also with a hook by which the holder can be easily and detachably connected to a fisherman's belt, pocket or basket rim.

A feature of invention is shown in the novel construction, combination and arrangement of the parts whereby a new and useful bait holder is provided.

Other objects, advantages and features of invention may appear from the accompanying drawing, the subjoined detailed description and the appended claims.

The accompanying drawing illustrates the invention.

Figure 1 is a perspective view of a bait holder constructed in accordance with this invention, showing it ready for use and with the lid held open.

Fig. 2 is a central vertical section through the bait holder supported on a belt.

Fig. 3 is a plan view of the bait holder attachment detached; dotted lines indicate a bait jar or can ready to be forced between the holder arms.

Fig. 4 is a rear view of the bait holder attachment detached.

Fig. 5 is an outside view of a stamped metal blank ready to be bent to form the attachment frame.

Fig. 6 is an enlarged fragmental sectional view analogous to Fig. 2, omitting the can.

Fig. 7 is a view of a blank for forming the lid.

The bait holder attachment 1 comprises a body 2 adapted and arranged to seat against a can of salmon egg bait for fishermen and having at its top and bottom, upper and lower pairs of forwardly extending arms 3, 4; adapted and arranged to clasp the upper and lower ends of the bait can, said body has a long extension bent downwardly to form a rearwardly disposed hook 5, and has at the bend, upwardly extending bearing lugs 6, all of which are integral in a blank that is stamped out of resilient sheet metal and bent into the form stated.

The die for stamping out the blank from which the attachment is formed is preferably provided with means for embossing an endless bead 7 outwardly adjacent the edge portions of the body and arms; and also to emboss a hairpin bead 8 adjacent the edge of the hook 5 so as to strengthen the parts and enable them to yieldingly maintain their shape after they are bent to a proper form.

After the blank has been stamped from the sheet metal, the body and pairs of arms are bent into the semi-cylindrical form shown in Fig. 3, adapted to fit snugly to the cylindrical surface of a standard salmon egg fish bait can.

The tip ends of the arms are slightly curved outward from the cylindrical contour of the arms so as to form guides 9 that aid in inserting a can into the holder. As indicated by dotted line in Fig. 3 the can 18 is placed in position between the oppositely arranged guides 9 and then forced in the direction of the arrow to spring the arms outward until the largest diameter of the can has passed the guides to a position in which the can is fully seated in the hold; and in which position the arms spring back to hold the can fully seated.

The hook 5 is preferably integral with the top end of the body and, after the body and arms are bent to proper form, the hook is bent into an upwardly extending loop 10 adjacent the body and downward in a compound curve that is first extended inward toward and then away from the back of the body.

After the hook is bent into the desired shape the lugs 6 are bent upright on the loop 10 in position to form a bearing for the pin 11 on which the lid 12 is pivoted.

The lid 12 is also stamped out of sheet metal and it is circular in form with oppositely arranged extensions 13, 14.

The extension 13 is provided with lugs 15 that are bent downward to extend inside and register with the lugs 6 on the loop 10 so that the pin 11 can be extended through them and pivotally connect the lid to the holder.

The extension 14 forms a convenient finger hold to facilitate the opening and closing of the lid.

The center portion of the lid is milled downward to form a stopper 16 that is adapted to fit snugly into the opening 17 of a can 18 when the holder is in use; and the stopper 16 is tapered and the edge of the opening 17 rounded so that a very close fit of the stopper in the opening of the can is established.

The lid 12 is held normally in closed position by a spring 19 that is coiled on the pin 11 and arranged to force the stopper 16 into the opening 17 so as to very securely seal the interior of the can from sun and air exposure.

If desired, the holder can be carried on a belt 20 as indicated in Fig. 2; and as shown therein the hook 5 is extended over the top edge of the belt and downward so that the holder and can therein are supported in an upright position, in which the lid can be opened and the contents of the can easily reached and removed.

In use, the holder can be supported as shown or attached to any convenient place as on a pocket band or basket rim of a fisherman's paraphernalia: in position to hold a salmon bait can which, as previously stated is thrust in between the pairs of arms 3, 4 in position for the lid 16 to seat in the can opening 17; in which position the extended rim of the can engages the upper edges of the pairs of arms 3 thereby preventing the can from slipping endwise relative to the can and holder.

When a can 18 is emptied it is removed and replaced by a filled can as described; and the lid functions to hold the contents in the can while the fisherman is in action; and also protects the contents of the can from deteriorating action of the sun and air.

When the fisherman desires to secure a salmon egg for baiting a hook on a line carried by a pole held by one hand he will simply insert a finger under the finger hold 14 as indicated in broken lines in Fig. 1 and lift the lid by such finger hold and then slip his fingers down into the can, secure the bait, withdraw his finger and allow the lid to automatically close.

It is thus seen that the device facilitates obtaining the bait under the difficult situations that may frequently arise in fishing in trout streams.

I claim:

1. The bait can holder attachment set forth comprising a body; a hook and arms integral with said body, said hook, arms, and body being a sheet metal stamping, and said body and arms being of a form adapted to engage and hold a can; a lid having a forward extension forming a finger hold; said lid being pivotally connected to the body and adapted to close the open end of the can; and a spring for normally holding the lid in closed position.

2. The bait can holder attachment set forth comprising a body; a hook and arms integral with said body, said hook, arms and body being a sheet metal stamping and of a semi-cylindrical form adapted to hold a can; a sheet metal lid pivotally connected to said body, and adapted to open and close the end of a can held by said holder; and a coiled spring for normally holding said lid in closed position.

3. A bait can holder comprising a body adapted to seat against a can, upper and lower pairs of arms integrally formed with said body, and adapted to clasp the can, a hook integral with said body and rearwardly disposed, bearing lugs integrally formed with said hook, a sheet metal lid, lugs depending from said sheet metal lid and coacting with said bearing lugs, and a coiled spring for normally holding said lid closed.

4. A bait can holder comprising a body adapted to seat against a can, upper and lower pairs of arms integrally formed with said body, and adapted to clasp the can, a hook integral with said body and rearwardly disposed, bearing lugs integrally formed with said hook, a sheet metal lid, lugs depending from said sheet metal lid and coacting with said bearing lugs, a coiled spring for normally holding said lid closed, an extending finger hold on said lid; and the center part of said lid being depressed to form a stopper to fit the opening of the can.

In testimony whereof, I have hereunto set my hand at Los Angeles, California, this 16th day of February, 1924.

WILLIAM A. PRUETT.